US012460851B2

(12) United States Patent
Adachi

(10) Patent No.: US 12,460,851 B2
(45) Date of Patent: Nov. 4, 2025

(54) REFRIGERATION-TYPE CHILLER

(71) Applicant: SMC CORPORATION, Chiyoda-ku (JP)

(72) Inventor: Makoto Adachi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 197 days.

(21) Appl. No.: 18/555,453

(22) PCT Filed: Mar. 24, 2022

(86) PCT No.: PCT/JP2022/013819
§ 371 (c)(1),
(2) Date: Oct. 13, 2023

(87) PCT Pub. No.: WO2022/224689
PCT Pub. Date: Oct. 27, 2022

(65) Prior Publication Data
US 2024/0200842 A1  Jun. 20, 2024

(30) Foreign Application Priority Data

Apr. 21, 2021  (JP) ................ 2021-071969

(51) Int. Cl.
*F25B 49/02*  (2006.01)
(52) U.S. Cl.
CPC ...... *F25B 49/02* (2013.01); *F25B 2600/2513* (2013.01)
(58) Field of Classification Search
CPC ................ F25B 49/02; F25B 2600/2513
See application file for complete search history.

(56) References Cited

U.S. PATENT DOCUMENTS

| 6,233,955 B1 | 5/2001 | Egara |
| 9,625,197 B2 | 4/2017 | Sugiyama |
(Continued)

FOREIGN PATENT DOCUMENTS

| JP | 6-12133 A | 1/1994 |
| JP | 2691001 B2 | 12/1997 |
(Continued)

OTHER PUBLICATIONS

Extended European Search Report issued Mar. 4, 2025, in corresponding European Patent Application No. 22791466.0, 5 pages.
(Continued)

*Primary Examiner* — Henry T Crenshaw
(74) *Attorney, Agent, or Firm* — Oblon, McClelland, Maier & Neustadt, L.L.P.

(57) ABSTRACT

A refrigeration-type chiller includes a coolant circuit that supplies a coolant to a load, a refrigeration circuit that adjusts the temperature of the coolant, and a control unit that controls the chiller as a whole. The control unit includes a temperature setting unit that sets, as an adjustment target temperature, the temperature of the coolant for causing the load to be at a target temperature, a time setting unit that sets an adjustment time during which to change the temperature of the coolant to the adjustment target temperature, an arithmetic unit that calculates a gradient of temperature change as a target temperature gradient from the adjustment target temperature and the adjustment time, and a temperature control unit that adjusts the opening degrees of first and second electronic expansion valves and so that the temperature of the coolant changes in accordance with the target temperature gradient.

4 Claims, 3 Drawing Sheets

(56) References Cited

U.S. PATENT DOCUMENTS

2008/0289811 A1 11/2008 Kariya
2015/0052917 A1 2/2015 Sugiyama

FOREIGN PATENT DOCUMENTS

| JP | 2816054 B2 | 10/1998 |
| JP | 2008-75920 A | 4/2008 |
| JP | 2008-292026 A | 12/2008 |
| JP | 2015-14417 A | 1/2015 |
| JP | 2019-191841 A | 10/2019 |

OTHER PUBLICATIONS

International Search Report issued May 17, 2022 in PCT/JP2022/013819 filed on Mar. 24, 2022, 2 pages.
Japanese Notice of Reasons for Refusal issued Dec. 17, 2024 in Japanese Patent Application No. 2021-071969 with English translation, 10 pgs.
Japanese Office Action issued Mar. 24, 2025 in Japanese Patent Application No. 2021-071969 (with English translation), 12 pages.
Office Action dated May 26, 2025, issued in Taiwanese application No. 111112460, with English translation.

REFRIGERATION-TYPE CHILLER

TECHNICAL FIELD

The present invention relates to a refrigeration-type chiller that adjusts the temperature of a load by supplying a temperature-regulated coolant to the load.

BACKGROUND ART

A refrigeration-type chiller, i.e. a coolant circulation apparatus, that keeps the temperature of a load constant by supplying a temperature-regulated coolant to the load is publicly known as described, for example, in PTL 1. This publicly-known coolant circulation apparatus includes a coolant circuit that supplies a coolant to a load, a refrigeration circuit that adjusts the temperature of the coolant through a heat exchange between a refrigerant and the coolant, and a heat exchanger that exchanges heat between the refrigerant and the coolant. The refrigeration circuit includes a compressor that compresses the refrigerant, a condenser that cools a high-temperature refrigerant discharged from the compressor, a first electronic expansion valve that sends to the heat exchanger a low-temperature refrigerant sent from the condenser, and a second electronic expansion valve that sends to the heat exchanger the high-temperature refrigerant discharged from the compressor. By adjusting the opening degrees of these first and second electronic expansion valves and thereby controlling the flow rates of the high-temperature and low-temperature refrigerants that are supplied to the heat exchanger, the refrigeration circuit keeps the temperature of the coolant at a constant temperature suited to cooling or heating the load, and by cooling or heating the load with this coolant, the refrigeration circuit keeps the temperature of the load constant.

Meanwhile, in the case of food and drink processing involving fermentation, aging, or other processes, long-duration delicate and precise temperature management may be required during the process. For example, a process for manufacturing craft beer includes a step of cooling a high-temperature (e.g. 30° C.) undiluted solution to a low temperature (e.g. 0° C.), and during this cooling step, it is necessary to gradually and precisely cool the undiluted solution over a long period of time (e.g. 24 to 48 hours) in order to extract yeast alive. Further, to the contrary, there is a step of heating a low-temperature undiluted solution to a high temperature.

Although it is possible to also use the coolant circulation apparatus for changing the temperature of a load in this way, the publicly-known coolant circulation apparatus is not directly applicable to such a use as to gradually change the temperature of a load and needs some improvement to be applicable, as the coolant circulation apparatus is configured to keep the temperature of a load constant by keeping the temperature of a coolant at a constant temperature suited to cooling or heating the load.

PRIOR ART

Patent Literature

PTL 1: Japanese Unexamined Patent Application Publication No. 2015-14417

SUMMARY OF THE INVENTION

Technical Problem

The present invention has as a technical object to provide a refrigeration-type chiller suited to gradually changing the temperature of a load to a target temperature over a given period of time.

Solution to Problem

To attain the foregoing object, a refrigeration-type chiller according to the present invention includes a coolant circuit that supplies a temperature-regulated coolant to a load, a refrigeration circuit that adjust a temperature of the coolant through a heat exchange between the coolant and a refrigerant, a heat exchanger that exchanges heat between the coolant and the refrigerant, and a control unit that controls the chiller as a whole. The coolant circuit includes a tank in which the coolant is stored, a pump that supplies the coolant in the tank to the load, and a temperature sensor that measures the temperature of the coolant. The control unit includes a temperature setting unit that sets an initial set temperature and an adjustment target temperature of the coolant for changing a temperature of the load to a target temperature, a time setting unit that sets an adjustment time for changing the temperature of the coolant from the initial set temperature to the adjustment target temperature, an arithmetic unit that calculates a gradient of temperature change as a target temperature gradient from the initial set temperature, the adjustment target temperature, and the adjustment time, and a temperature control unit that so adjusts a temperature of the refrigerant that is supplied to the heat exchanger that the temperature of the coolant changes in accordance with the target temperature gradient.

It is desirable that the present invention be configured such that the refrigeration circuit includes a compressor that compresses the refrigerant, a condenser that cools a high-temperature refrigerant discharged from the compressor, a first electronic expansion valve that sends to the heat exchanger a low-temperature refrigerant sent from the condenser, and a second electronic expansion valve that sends to the heat exchanger the high-temperature refrigerant discharged from the compressor, and the control unit divides the adjustment time into a plurality of time domains, calculates for each time domain a current target temperature in that time domain from the target temperature gradient and a time elapsed in the time domain, compares with the current target temperature a current temperature of the coolant as measured by the temperature sensor, adjusts opening degrees of the first and second electronic expansion valves on the basis of a comparison result, and thereby adjusts the temperature of the refrigerant that is supplied to the heat exchanger.

Further, a refrigeration-type chiller according to the present invention includes a coolant circuit that supplies a temperature-regulated coolant to a load, a refrigeration circuit that adjusts a temperature of the coolant through a heat exchange between the coolant and a refrigerant, a heat exchanger that exchanges heat between the coolant and the refrigerant, and a control unit that controls the chiller as a whole. The coolant circuit includes a tank in which the coolant is stored, a pump that supplies the coolant in the tank to the load, and a load temperature sensor that measures a temperature of the load. The control unit includes a temperature setting unit that sets an initial set temperature and an adjustment target temperature of the load, a time setting unit that sets an adjustment time for changing the temperature of the load from the initial set temperature to the adjustment target temperature, an arithmetic unit that calculates a gradient of temperature change as a target temperature gradient from the initial set temperature, the adjustment target temperature, and the adjustment time, and a temperature control unit that changes the temperature of the coolant by so adjusting a temperature of the refrigerant that is supplied to the heat exchanger that the temperature of the load changes in accordance with the target temperature gradient.

In this case, it is desirable that a configuration be set up such that the refrigeration circuit includes a compressor that compresses the refrigerant, a condenser that cools a high-temperature refrigerant discharged from the compressor, a first electronic expansion valve that sends to the heat exchanger a low-temperature refrigerant sent from the condenser, and a second electronic expansion valve that sends to the heat exchanger the high-temperature refrigerant discharged from the compressor, and the control unit divides the adjustment time into a plurality of time domains, calculates for each time domain a current target temperature in that time domain from the target temperature gradient and a time elapsed in the time domain, compares with the current target temperature a current temperature of the load as measured by the load temperature sensor, adjusts opening degrees of the first and second electronic expansion valves on the basis of a comparison result, and thereby adjusts the temperature of the refrigerant that is supplied to the heat exchanger.

Advantageous Effects of Invention

According to the present invention, the target temperature gradient is calculated from the adjustment target temperature and the adjustment time in adjusting the temperature of the load, and the load is changed to the target temperature by changing the temperature of the coolant in accordance with the target temperature gradient, so that the temperature of the load can be gradually and precisely changed to the target temperature over a long period of time.

DESCRIPTION OF EMBODIMENTS

Figure 1:
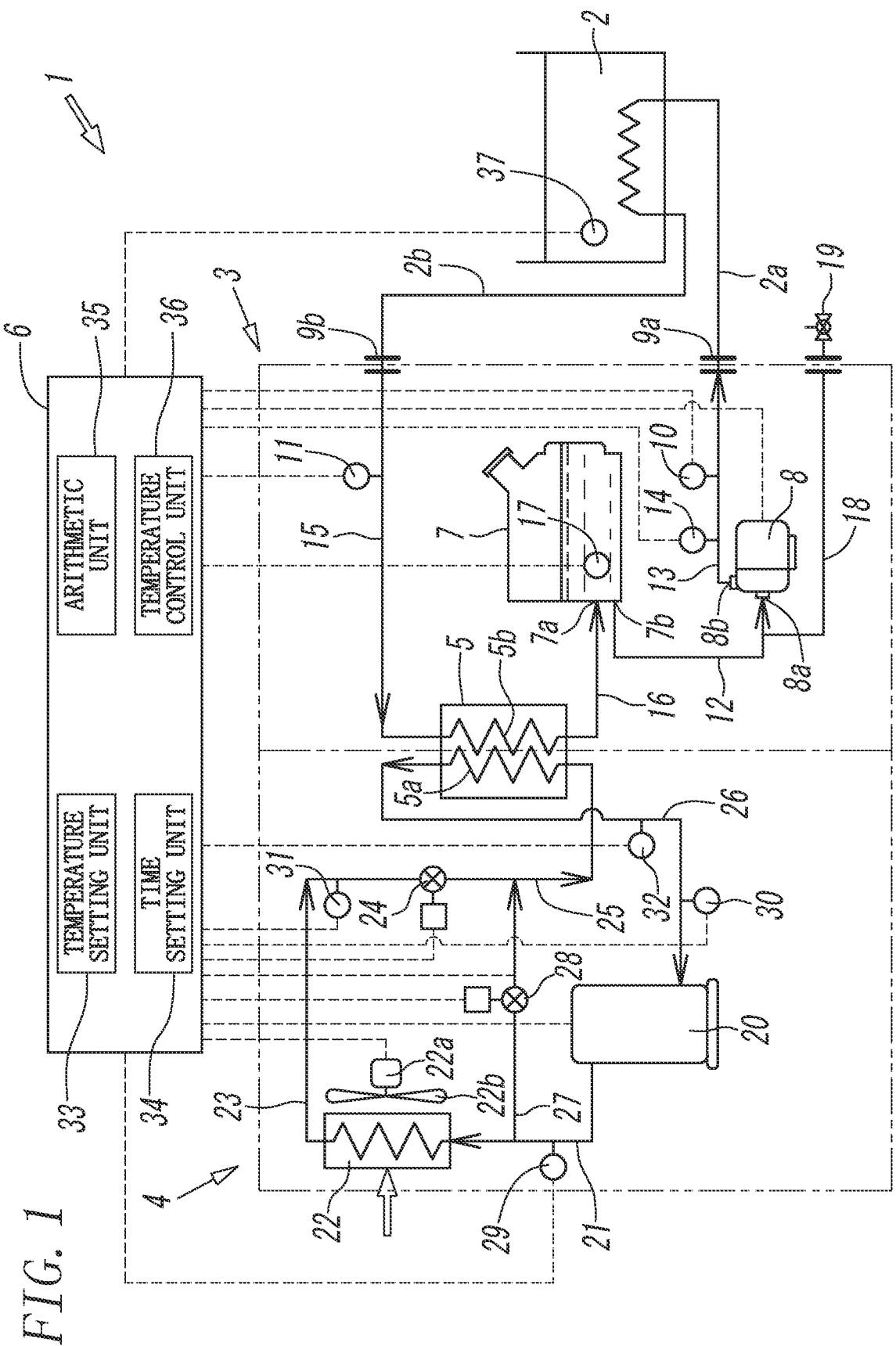
FIG. 1 is a block diagram schematically showing a refrigeration-type chiller according to an embodiment of the present invention.

FIG. 1 shows a refrigeration-type chiller according to an embodiment of the present invention. This chiller 1 is intended to change the temperature of a load 2 from an adjustment-starting temperature to a target temperature and includes a coolant circuit 3 that supplies to the load 2 a temperature-regulated coolant suited to adjusting the temperature of the load 2, a refrigeration circuit 4 that adjusts the temperature of the coolant through a heat exchange between the coolant and a refrigerant, a heat exchanger 5 that exchanges heat between the coolant and the refrigerant, and a control unit 6 that controls the chiller as a whole. The heat exchanger 5 includes a refrigerant pipe 5a (evaporator) through which the refrigerant flows and a coolant pipe 5b through which the coolant flows.

The coolant not only cools the load 2 but also can heat the load 2 by having its temperature made higher than the temperature of the load 2.

Further, in the present embodiment, the load 2 is a liquid such as an undiluted solution of craft beer.

The coolant circuit 3 includes a tank 7 in which the coolant is stored, a pump 8 that supplies the coolant in the tank 7 to the load 2, a supply side connecting port 9a to which a supply side load pipe 2a of the load 2 is connected, a return side connecting port 9b to which a return side load pipe 2b of the load 2 is connected, a supply side temperature sensor 10 that detects the temperature of the coolant that is supplied to the load 2, and a return side temperature sensor 11 that detects the temperature of the coolant that flows back from the load 2.

A suction port 8a of the pump 8 is connected to an outlet 7b of the tank 7 by a first supply pipe 12, and a discharge port 8b of the pump 8 is connected to the supply side connecting port 9a by a second supply pipe 13. To the second supply pipe 13, the supply side temperature sensor 10 and a pressure sensor 14 are connected.

Further, the return side connecting portion 9b is connected to one end of the coolant pipe 5b of the heat exchanger 5 by a return pipe 15, and the other end of the coolant pipe 5b is connected to an inlet 7a of the tank 7 by a second return pipe 16. The return side temperature sensor 11 is connected to the first return pipe 15.

Furthermore, a level switch 17 that monitors the liquid level of the coolant is provided inside the tank 7. A drainage pipe 18 is connected to the first supply pipe 12. The drainage pipe 18 is provided with a drainage port 19.

The pump 8, the supply side temperature sensor 10, the return side temperature sensor 11, the pressure sensor 14, and the level switch 17 are electrically connected to the control unit 6, which controls or monitors each of these pieces of equipment.

In the coolant circuit 3, the coolant in the tank 7 is supplied to the load 2 through the second supply pipe 13 and the supply side load pipe 2a by the pump 8 to adjust the temperature of the load 2. The coolant, whose temperature has undergone a temperature change by adjusting the temperature of the load 2, flows back to the first return pipe 15 through the return side load pipe 2b, undergoes temperature adjustment by exchanging heat with the refrigerant in the heat exchanger 5, and then returns into the tank 7.

Meanwhile, the refrigeration circuit 4 includes a compressor 20 that compresses a gaseous refrigerant into a high-temperature and high-pressure gaseous refrigerant and discharges the high-temperature and high-pressure gaseous refrigerant, a condenser 22 that cools a gaseous refrigerant sent from the compressor 20 through a first pipe 21 and thereby turns the gaseous refrigerant into a low-temperature and high-pressure liquid refrigerant, a first electronic expansion valve 24 that expands a refrigerant sent from the condenser 22 through a second pipe 23 and thereby turns the refrigerant into a low-temperature and low-pressure liquid refrigerant, and the evaporator 5a, which evaporates, through a heat exchange with the coolant, a liquid refrigerant sent from the first electronic expansion valve 24 through a third pipe 25 and thereby turns the liquid refrigerant into a low-pressure gaseous refrigerant. The gaseous refrigerant out of the evaporator 5a is returned to the compressor 20 through a fourth pipe 26. Further, the first pipe 21 and the third pipe 25 are connected to each other by a bypass pipe 27. Connected to the bypass pipe 27 is a second electronic expansion valve 28 that sends to the evaporator 5a the high-temperature and high-pressure gaseous refrigerant discharged from the compressor 20.

The condenser 22 is an air-cooled condenser that cools a refrigerant with a fan 22b driven by an electric motor 22a, and the rotation speed of the condenser 22 is controlled according to the pressure of the refrigerant as measured by the after-mentioned first refrigerant pressure sensor 31.

Meanwhile, the pump 8 and the compressor 20 are fully operated at fixed rotation speeds by a commercial power source.

Connected to the first pipe 21 is a first refrigerant temperature sensor 29 that detects the temperature of the refrigerant discharged from the compressor 20. Connected to the fourth pipe 26 is a second refrigerant temperature sensor 30 that detects the temperature of the gaseous refrigerant that returns to the compressor 20. Furthermore, connected to the second pipe 23 is the first refrigerant pressure sensor 31, which measures the pressure of the high-pressure refrigerant. Connected to the fourth pipe 26 is a second refrigerant pressure sensor 32 that measures the pressure of the low-pressure refrigerant.

The compressor 20, the electric motor 22a of the condenser 22, the first electronic expansion valve 24, the second electronic expansion valve 28, the first refrigerant pressure sensor 31, the second refrigerant pressure sensor 32, the first refrigerant temperature sensor 29, and the second refrigerant temperature sensor 30 are electrically connected to the control unit 6, which controls or monitors each of these pieces of equipment.

In the refrigeration circuit 4, the high-temperature and high-pressure gaseous refrigerant discharged from the compressor 20 is sent to the condenser 22 through the first pipe 21 and turns into a low-temperature and high-pressure liquid refrigerant by being cooled by the condenser 22. Then, the low-temperature and high-pressure liquid refrigerant is sent to the first electronic expansion valve 24 through the second pipe 23. In the first electronic expansion valve 24, a quantity of flow of refrigerant corresponding to the opening degree of the first electronic expansion valve 24 is expanded into a low-temperature and low-pressure refrigerant that is sent to the evaporator 5a of the heat exchanger 5 through the third pipe 25.

Further, part of the high-temperature and high-pressure gaseous refrigerant discharged from the compressor 20 is also sent to the second electronic expansion valve 28 through the bypass pipe 27. A quantity of flow of refrigerant corresponding to the opening degree of the second electronic expansion valve 28 is expanded by the second electronic expansion valve 28 into a high-temperature and low-pressure gaseous refrigerant that is then sent to the third pipe 25 and temperature-regulated by being mixed with the low-temperature liquid refrigerant from the first electronic expansion valve 24. Then, the refrigerant mixture is sent to the evaporator 5a of the heat exchanger 5. Then, the refrigerant having turned into a low-pressure gas by exchanging heat with the coolant in the heat exchanger 5 returns to the compressor 20 through the fourth pipe 26.

Accordingly, the first electronic expansion valve 24 and the second electronic expansion valve 28 constitute a refrigerant temperature adjustment mechanism that adjusts the temperature of the refrigerant that is supplied to the heat exchanger 5.

The control unit 6 includes a microcomputer (not illustrated) configured to gradually change (raise or drop) the temperature of the coolant from an initial temperature set (initial set temperature) to a target temperature (adjustment target temperature), i.e. an adjusted temperature, over a given period of time and thereby gradually change (raise or drop) the temperature of the load 2 to the same target temperature over a given period of time. The following example of control is a case in which the temperature of the load 2 is raised to the same target temperature by raising the temperature of the coolant from the initial set temperature (e.g. 0° C.) to the adjustment target temperature (e.g. 30° C.).

Figure 2:
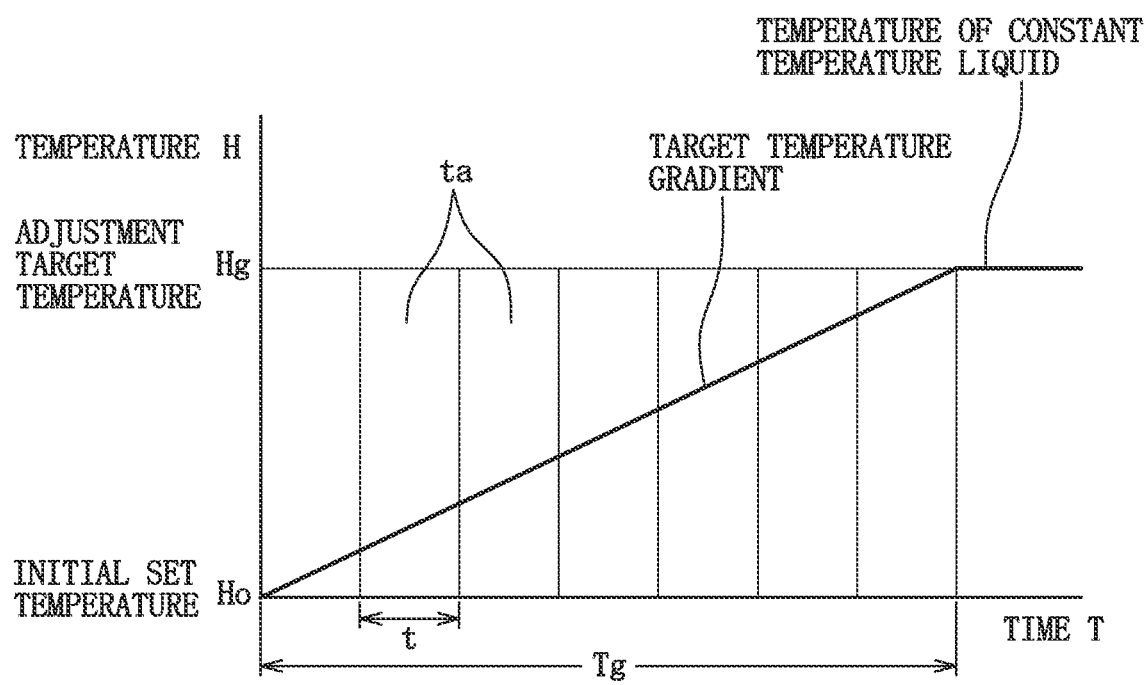
FIG. 2 is a diagram showing a relationship between temperature change and time.

For this purpose, as shown in FIGS. 1 and 2, the control unit 6 includes a temperature setting unit 33 that sets an initial set temperature Ho and an adjustment target temperature Hg of the coolant, a time setting unit 34 that sets an adjustment time Tg for changing the temperature of the coolant from the initial set temperature Ho to the adjustment target temperature Hg, an arithmetic unit 35 that calculates a gradient of temperature change as a target temperature gradient from the initial set temperature Ho, the adjustment target temperature Hg, and the adjustment time Tg, and a temperature control unit 36 that adjusts the opening degrees of the first and second electronic expansion valves 24 and 28 so that the temperature of the coolant changes in accordance with the target temperature gradient.

Figure 3:
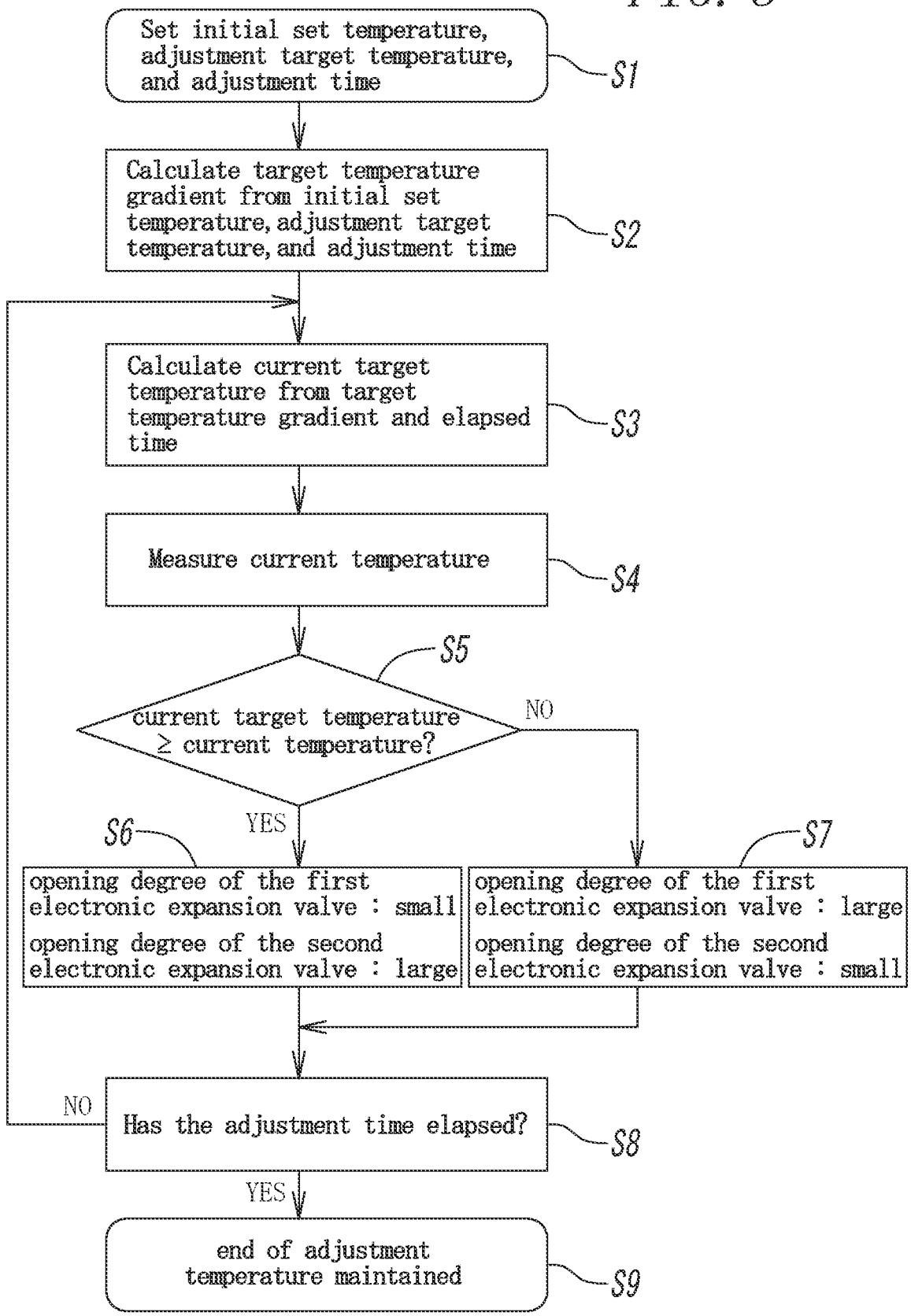
FIG. 3 is a flow chart for temperature control.

FIG. 3 is a flow chart of a case in which the temperature control of the load 2 is performed by the control unit 6. In this flow chart, in step S1, which precedes the start of the temperature control, the initial set temperature Ho and adjustment target temperature Hg of the coolant are inputted to the temperature setting unit 33, and the adjustment time Tg (e.g. 24 hours) is inputted to the time setting unit 34. After that, the temperature control is started. Note, however, that it is possible to use a previously set temperature as the initial set temperature Ho and omit to input the initial set temperature Ho here.

It should be noted that the initial set temperature Ho, the adjustment target temperature Hg, and the adjustment time Tg can be determined on the basis of data obtained by finding a relationship between a change in temperature of the coolant and a change in temperature of the load 2 in advance through experiments, calculations, or other processes.

Further, the adjustment time Tg is divided into a plurality of time domains ta as shown in FIG. 2. A change in temperature of the coolant is confirmed for each time domain ta, and the temperature control is performed on the basis of a confirmatory result. The time domains ta may be equal in duration to each other or may be different in duration from each other.

Once the temperature control gets started after step S1, the control unit 6 shifts to step S2, in which the arithmetic unit 35 calculates a gradient of temperature change as a target temperature gradient $\Delta H$ from the initial set temperature Ho, the adjustment target temperature Hg, and the adjustment time Tg. For example, the target temperature gradient $\Delta H$ is 0.02° C./min in a case in which the initial set temperature Ho is 0° C., the adjustment target temperature Hg is 30° C., and the adjustment time Tg is 24 hours.

Next, in step S3, a current target temperature at an end of the first time domain ta of the adjustment time Tg is calculated from the target temperature gradient $\Delta H$ and a time t elapsed in the time domain ta. At the same time, in step S4, the current temperature of the coolant that is supplied to the load 2 is set by the supply side temperature sensor 10. This current temperature is compared with the current target temperature in step S5.

Then, in a case in which the current temperature is lower than the current target temperature or equal to the current target temperature, the control unit 6 proceeds to step S6, in which the temperature control unit 36 reduces the opening degree of the first electronic expansion valve 24 and increases the opening degree of the second electronic expansion valve 28. As a result of that, the temperature of the refrigerant rises due to a decrease in flow rate of a low-temperature refrigerant that is supplied to the heat exchanger 5 and an increase in flow rate of a high-temperature refrigerant that is supplied to the heat exchanger 5. This enhances the heating capacity of the heat exchanger 5, so that the temperature of the coolant rises.

On the other hand, in a case in which the current temperature is higher than the current target temperature, the control unit 6 proceeds from step S5 to step S7, in which the temperature control unit 36 increases the opening degree of the first electronic expansion valve 24 and reduces the opening degree of the second electronic expansion valve 28. As a result of that, the temperature of the refrigerant lowers due to an increase in flow rate of a low-temperature refrigerant that is supplied to the heat exchanger 5 and a decrease in flow rate of a high-temperature refrigerant that is supplied to the heat exchanger 5. This enhances the cooling capacity of the heat exchanger 5, so that the temperature of the coolant drops.

Once the operation of step S6 or step S7 ends, it is determined in step S8 whether the adjustment time Tg has elapsed. In a case in which the adjustment time Tg has not elapsed, the control unit 6 returns to step S3, and for the second and subsequent time domains ta, the operations of step S3, step S4, step S5, step S6 or S7, and step S8 are repeated in sequence.

Meanwhile, in a case in which the adjustment time Tg has elapsed, the control unit 6 shifts to step S9 to end the adjustment of the temperature of the coolant, so that the temperature of the coolant is maintained at the adjustment target temperature Hg. Accordingly, the temperature of the load 2 too is maintained at substantially the same temperature as the adjustment target temperature Hg.

It should be noted that providing the load 2 with a load temperature sensor 37 makes it possible to always monitor the temperature of the load 2 and compares the temperature of the load 2 with the current temperature of the coolant.

Further, an electric heater can be provided in the tank 7 so that in a case in which the heating of the coolant by the refrigerant is insufficient, this heater can be complementarily used to raise the temperature of the coolant.

Although, in the example of control, the temperature of the load 2 is raised in one step from 0° C. to 30° C., the temperature of the load 2 may be adjusted in multiple steps by setting a plurality of the adjustment target temperatures Hg. For example, by setting the adjustment target temperature Hg in two steps of 30° C. and 60° C., such control can be performed that the temperature of the load 2 is raised to 30° C., maintained at that temperature for a required period of time, and then further raised to 60° C.

Further, although, in the example of control, the temperature of the load 2 is raised, such control may be performed that the temperature of the load 2 is lowered. For example, in lowering the temperature of the load 2 from 30° C. to 0° C., it is only necessary to set the initial set temperature Ho of the coolant to 30° C., set the adjustment target temperature Hg to 0° C., and perform control in accordance with the flow chart shown in FIG. 3. Note, however, that in this case, it is necessary to lower the temperature of the coolant along the target temperature gradient in a case in which the current temperature of the coolant is equal to the current target temperature in step S5; therefore, the control unit 6 shifts to step S7, in which the opening degree of the first electronic expansion valve 24 is increased and the opening degree of the second electronic expansion valve 28 is reduced.

Furthermore, instead of simply raising or lowering the temperature of the load 2 as previously mentioned, a combination of control that causes the temperature to rise, control that causes the temperature to lower, and control that maintains the temperature for a given period of time can be performed.

Further, although, in the aforementioned example of control, the temperature of the load 2 is adjusted by adjusting the temperature of the coolant that is supplied from the coolant circuit 3 to the load 2, the temperature of the load 2 may be adjusted by adjusting the temperature of the coolant that flows back from the load 2 to the coolant circuit 3. In this case, in the flow chart shown in FIG. 3, the current temperature of the coolant in step S4 is measured by the return side temperature sensor 11 connected to the first return pipe 15.

Furthermore, although, in the aforementioned example of control, the temperature of the load 2 is adjusted to the target temperature by setting the initial set temperature Ho and adjustment target temperature Hg of the coolant and adjusting the temperature of the coolant along the temperature gradient, such a configuration may be set up to set the initial set temperature Ho and adjustment target temperature Hg of the load 2 and adjust the temperature of the coolant so that the temperature of the load 2 changes along the temperature gradient. In this case, the load 2 is provided with the load temperature sensor 37, by which the temperature of the load 2 is measured as a current temperature that is compared with the current target temperature in step S5 of the flow chart shown in FIG. 3. Then, the temperature of the coolant is adjusted by adjusting the opening degrees of the first and second electronic expansion valves 24 and 28 so that the current temperature of the load 2 changes in accordance with the target temperature gradient.

Further, the pump 8, the compressor 20, and the electric motor 22a, which are used in the refrigeration-type chiller 1 of FIG. 1, may be of an inverter-controlled type. This makes it possible to enhance responsivity by changing the amount of circulation of refrigerant by inverter-controlling the rotation speed of the compressor 20 in addition to changing the opening degrees of the first and second electronic expansion valves 24 and 28 in order to adjust the temperature of the refrigerant in steps S6 and S7 of the flow chart shown in FIG. 3 and, at the same time, also makes it possible to achieve saving of energy by reducing the amount of circulation of refrigerant. Similarly, the rotation speed of the pump 8 can be reduced according to the load. This leads to saving of energy.

REFERENCE SIGNS LIST 1 chiller
2 load
3 coolant circuit
4 refrigeration circuit
5 heat exchanger
6 control unit
7 tank
8 pump
10 supply side temperature sensor
11 return side temperature sensor
20 compressor
22 condenser
24 first electronic expansion valve
28 second electronic expansion valve 33 temperature setting unit
34 time setting unit
35 arithmetic unit
36 temperature control unit
37 load temperature sensor
Hg adjustment target temperature
Ho initial temperature
Tg adjustment time
ta time domain
t time elapsed
ΔH target temperature gradient

The invention claimed is:

1. A refrigeration-type chiller comprising:
a coolant circuit that supplies a temperature-regulated coolant to a load;
a refrigeration circuit that adjusts a temperature of the coolant through a heat exchange between the coolant and a refrigerant;
a heat exchanger that exchanges heat between the coolant and the refrigerant; and
a control unit that controls the chiller as a whole,
wherein
the coolant circuit includes a tank in which the coolant is stored, a pump that supplies the coolant in the tank to the load, and a temperature sensor that measures the temperature of the coolant, and
the control unit includes a temperature setting unit that sets an initial set temperature and an adjustment target temperature of the coolant for changing a temperature of the load to a target temperature, a time setting unit that sets an adjustment time for changing the temperature of the coolant from the initial set temperature to the adjustment target temperature, an arithmetic unit that calculates a gradient of temperature change as a target temperature gradient from the initial set temperature, the adjustment target temperature, and the adjustment time, and a temperature control unit that so adjusts a temperature of the refrigerant that is supplied to the heat exchanger that the temperature of the coolant changes in accordance with the target temperature gradient.

2. The refrigeration-type chiller according to claim 1, wherein
the refrigeration circuit includes a compressor that compresses the refrigerant, a condenser that cools a high-temperature refrigerant discharged from the compressor, a first electronic expansion valve that sends to the heat exchanger a low-temperature refrigerant sent from the condenser, and a second electronic expansion valve that sends to the heat exchanger the high-temperature refrigerant discharged from the compressor, and
the control unit divides the adjustment time into a plurality of time domains, calculates for each time domain a current target temperature in that time domain from the target temperature gradient and a time elapsed in the time domain, compares with the current target temperature a current temperature of the coolant as measured by the temperature sensor, adjusts opening degrees of the first and second electronic expansion valves on the basis of a comparison result, and thereby adjusts the temperature of the refrigerant that is supplied to the heat exchanger.

3. A refrigeration-type chiller comprising:
a coolant circuit that supplies a temperature-regulated coolant to a load;
a refrigeration circuit that adjusts a temperature of the coolant through a heat exchange between the coolant and a refrigerant;
a heat exchanger that exchanges heat between the coolant and the refrigerant; and
a control unit that controls the chiller as a whole,
wherein
the coolant circuit includes a tank in which the coolant is stored, a pump that supplies the coolant in the tank to the load, and a load temperature sensor that measures a temperature of the load, and
the control unit includes a temperature setting unit that sets an initial set temperature and an adjustment target temperature of the load, a time setting unit that sets an adjustment time for changing the temperature of the load from the initial set temperature to the adjustment target temperature, an arithmetic unit that calculates a gradient of temperature change as a target temperature gradient from the initial set temperature, the adjustment target temperature, and the adjustment time, and a temperature control unit that changes the temperature of the coolant by so adjusting a temperature of the refrigerant that is supplied to the heat exchanger that the temperature of the load changes in accordance with the target temperature gradient.

4. The refrigeration-type chiller according to claim 3, wherein
the refrigeration circuit includes a compressor that compresses the refrigerant, a condenser that cools a high-temperature refrigerant discharged from the compressor, a first electronic expansion valve that sends to the heat exchanger a low-temperature refrigerant sent from the condenser, and a second electronic expansion valve that sends to the heat exchanger the high-temperature refrigerant discharged from the compressor, and
the control unit divides the adjustment time into a plurality of time domains, calculates for each time domain a current target temperature in that time domain from the target temperature gradient and a time elapsed in the time domain, compares with the current target temperature a current temperature of the load as measured by the load temperature sensor, adjusts opening degrees of the first and second electronic expansion valves on the basis of a comparison result, and thereby adjusts the temperature of the refrigerant that is supplied to the heat exchanger.

* * * * *